United States Patent
Duncan

(10) Patent No.: US 7,290,153 B2
(45) Date of Patent: Oct. 30, 2007

(54) SYSTEM, METHOD, AND APPARATUS FOR REDUCING POWER CONSUMPTION IN A MICROPROCESSOR

(75) Inventor: Richard Duncan, Bedford, TX (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 452 days.

(21) Appl. No.: 10/983,913

(22) Filed: Nov. 8, 2004

(65) Prior Publication Data

US 2006/0101291 A1    May 11, 2006

(51) Int. Cl.
*G06F 1/32* (2006.01)
(52) U.S. Cl. .................. 713/320; 713/322; 713/323; 712/209; 712/210
(58) Field of Classification Search ................. 713/320
See application file for complete search history.

(56) References Cited

U.S. PATENT DOCUMENTS

| | | | |
|---|---|---|---|
| 5,142,635 A * | 8/1992 | Saini | 712/225 |
| 5,222,240 A * | 6/1993 | Patel | 712/218 |
| 6,430,727 B1 * | 8/2002 | Warren | 716/4 |
| 6,654,871 B1 | 11/2003 | Aidan et al. | |
| 6,665,793 B1 * | 12/2003 | Zahir et al. | 712/228 |
| 6,851,044 B1 * | 2/2005 | Stravers | 712/218 |
| 6,862,677 B1 * | 3/2005 | Stravers | 712/218 |
| 2003/0172258 A1 * | 9/2003 | Krishnan | 712/234 |

FOREIGN PATENT DOCUMENTS

TW        535089        6/2003

* cited by examiner

*Primary Examiner*—Nitin C. Patel
(74) *Attorney, Agent, or Firm*—Thomas, Kayden, Horstemeyer & Risley

(57) ABSTRACT

Included in this disclosure is a circuit for reducing power consumption in a microprocessor. The circuit comprises a microprocessor, at least one full instruction decoder configured to decode a present instruction, and at least one subset instruction decoder configured to determine whether the present instruction potentially needs a register. A memory element is also included and is configured to hold data from a previous instruction. A selector is included and configured to output either the previous instruction or the decoded present instruction, based on the subset instruction decoder.

16 Claims, 7 Drawing Sheets

SYSTEM, METHOD, AND APPARATUS FOR REDUCING POWER CONSUMPTION IN A MICROPROCESSOR

TECHNICAL FIELD

The present disclosure is generally related to processors, and more particularly to decoder circuitry for a processor having a reduced-power operation.

BACKGROUND OF THE DISCLOSURE

Processors (e.g., microprocessors, CPUs, etc.) are well known and used in a wide variety of products and applications, from desktop computers to portable electronic devices, such as cellular phones, laptop computers, and PDAs (personal digital assistants). As is known, some processors are extremely powerful (e.g., processors in high-end computer workstations), while other processors have a simpler design, for lower-end, less expensive applications and products.

As is also known, there is a general dichotomy between performance and power. Generally speaking, high-performance processors having faster operation and/or more complex designs tend to consume more power than lower-performance counterparts. Higher power consumption generally leads to higher operating temperatures and shorter battery life (for devices that operate from battery power). The ever-increasing demand and use of portable electronic devices is driving a demand to produce processors that realize reduced-power operation, while at the same time maintaining satisfactory performance levels.

One method for reducing the power consumption of devices is to provide modes of reduced-power operation (sometimes referred to as "sleep states") when the devices (or certain portions thereof) are not in use. However, there is also a desire to reduce the power consumption of devices during active operation, as well. This is often accomplished by providing more efficient designs to the operational components of the devices.

There are a number of power-consuming components in various electronic devices, and the processor is one of them. Even within a processor, there are a number of functional sections, and decoder logic is one such area. The decoder logic of a processor decodes an encoded instruction into a number electrical signals for controlling and carrying out the function of the instruction within execution logic provided in the processor. FIG. 1 is a block diagram illustrating a processor design that includes a decode stage.

The processor circuitry as shown in FIG. 1, however, has certain drawbacks. More specifically, many operations a processor performs do not access a register. When the processor executes such a function, a normal decode stage operates as if a register is needed. When no register is accessed, the logic gates within the decoder tend to switch from one state to another, thereby increasing power dissipation in the processor, shortening battery life.

Accordingly, there is a heretofore unaddressed need to overcome the aforementioned deficiencies and shortcomings.

SUMMARY

This disclosure describes systems and methods for reducing power consumption in a microprocessor. One embodiment of a system disclosed comprises subset instruction decoder logic configured to determine whether a present instruction potentially involves a register, and full instruction decoder logic configured to determine the at least one register needed by the present instruction. Also included in the system is a register signal, memory logic, and selector logic. The register signal is configured to indicate the at least one register determined by the full instruction decoder. The memory logic is configured output at least one control signal. The selector logic is configured to output the control signal if there is no register needed by the present instruction and the register signal if a register signal is needed by the present instruction.

Embodiments of the present disclosure can also be viewed as providing methods for reducing power consumption in a microprocessor. In this regard, one embodiment of such a method, among others, can be broadly summarized by the following steps: fetching a present instruction; determining whether the present instruction involves a register; producing a signal that indicates whether a register is involved; producing a register select, the register select having a present state and indicating registers involved by the present instruction; and maintaining the present state of the register select when no register is required.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
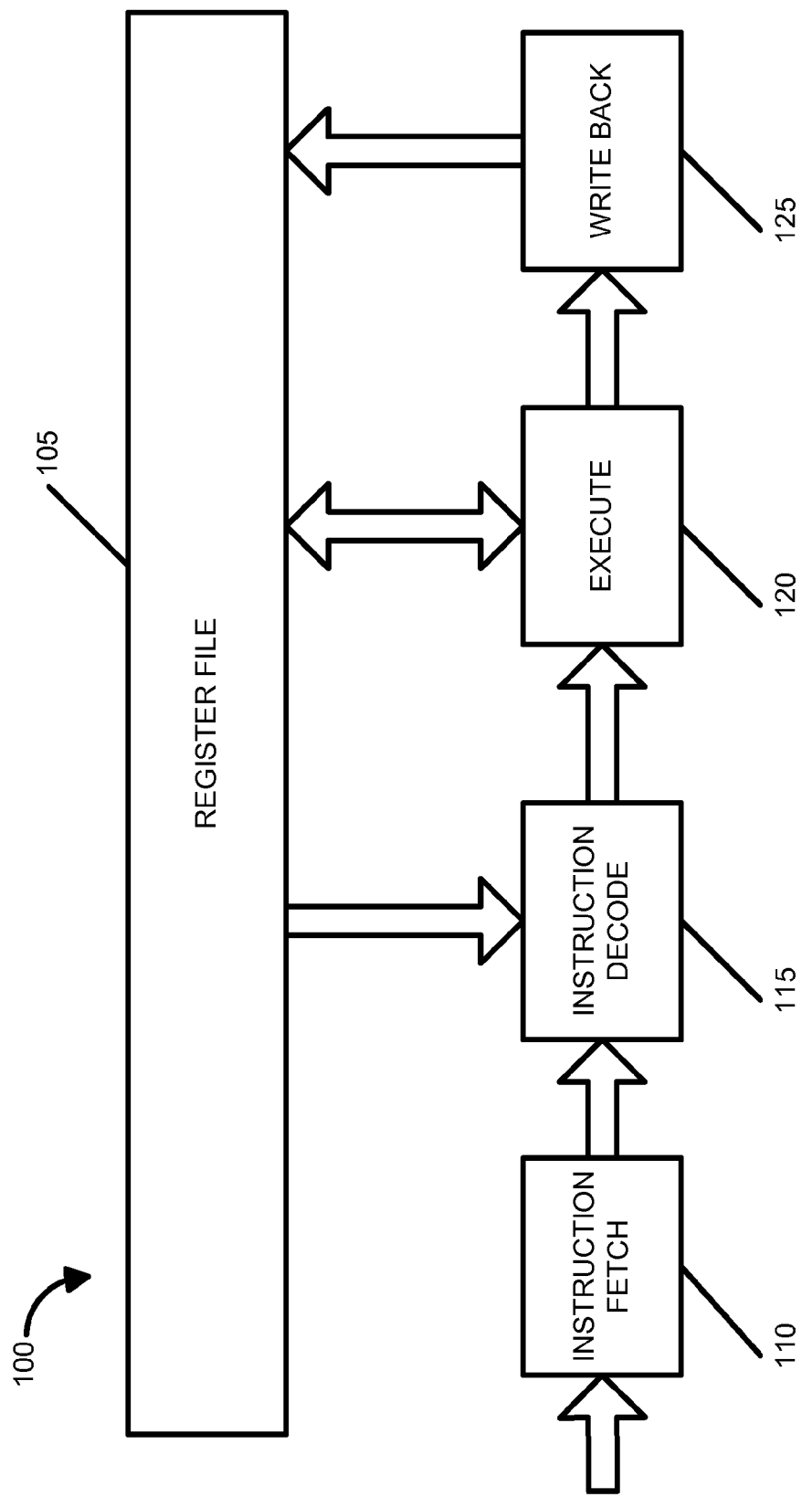
FIG. 1 is a functional block diagram of one embodiment of a pipeline microprocessor configuration.

The present disclosure is generally directed to a processor having improved decode logic. In accordance with one embodiment, the processor includes first decoder logic capable of decoding a plurality of encoded instructions comprising an instruction set, the full decoder logic having an input to receive an encoded instruction output from the fetch logic. The processor also includes subset decoder logic capable of determining whether a register is necessary for the present instruction. In operation, the decoder control logic operates such that when the second decoder logic detects that a register is potentially necessary for the present instruction, the first decoder logic will send the necessary registers to execute stage. Likewise, when the second decoder logic determines that no register is necessary for the present instruction, memory logic will stabilize the processor's logic gates by sending a previous register address to execute stage. By sending a previous register address, the circuit uses less power.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

Having summarized various aspects of the present disclosure, reference will now be made in detail to the description as illustrated in the drawings. While the disclosure will be described in connection with these drawings, there is no intent to limit it to the embodiment or embodiments disclosed therein. On the contrary, the intent is to cover all alternatives, modifications, and equivalents included within the spirit and scope of the invention as defined by the appended claims. It should be emphasized that many variations and modifications may be made to the above-described embodiments. All such modifications and variations are intended to be included herein within the scope of this disclosure and protected by the following claims.

A pipeline configuration within a central processing unit (CPU) comprises a sequence of actions performed when executing each machine code instruction in a program. At the beginning of each cycle the CPU presents the value of the program counter on the address bus (not shown). The CPU then fetches the instruction from main memory (possibly via a cache and/or a pipeline) via the data bus into the instruction register similar to an automobile assembly line, a pipeline configuration increases the speed that instructions are executed by allocating a particular task to a different piece of logic. Once the task is complete, the logic may perform the task to the next instruction, regardless of the state of the present instruction.

FIG. 1 represents a functional block diagram 100 of a possible pipeline configuration in a CPU. In this representation, which is a nonlimiting example, the CPU performs 4 steps. In the first step, the CPU fetches an instruction from another part of the computer, as illustrated in block 110 and described above.

After instruction fetch 110 is implemented, the processor decodes the present instruction to determine how to execute it. Decoding the present instruction may reveal whether the present instruction calls for an Arithmetic Logic Unit (ALU) function (such as add, subtract, etc.); whether the processor will perform an addressing function; or another type of function to be performed. Decode stage 115 determines which registers are involved to execute the present instruction and then accesses those registers from register file 105. Once the registers are recognized, decode stage 115 will also fetch the data from the appropriate register(s) (or RAM, cache, etc.) for use by the execute stage 120.

Once the present instruction is decoded and the registers are accessed, execute stage 120 executes the present instruction. This means that execute stage 120 calculates the results of the instruction. These results include the addresses of loads and stores, as well as values computed by the ALU. For example, if the present instruction calls for addition, execute stage 120 will perform addition on the two values stated.

Once the instruction is executed, the processor will then implement write back stage 125 the new data back into the appropriate register(s) located in register file 105. With an addition function, the ALU will generally be given two values located in two different registers. The ALU will perform the add function. Write back stage 125 will then put the result into a register designated by the instruction. The CPU increments the program counter to address the next instruction and the cycle is repeated. This operation stops when the processor is instructed to break the cycle.

Figure 2:
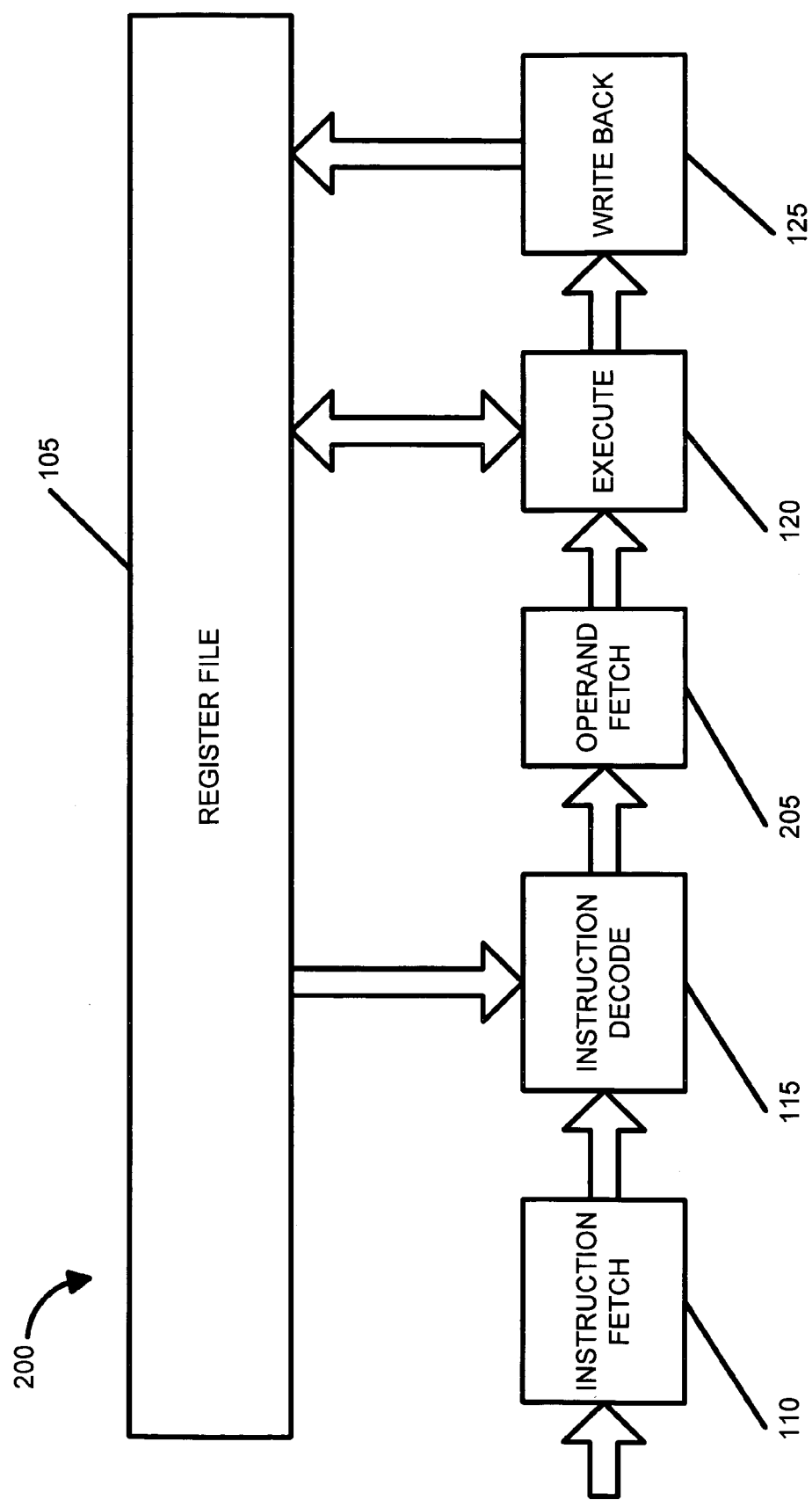
FIG. 2 is a functional block diagram of an alternate embodiment to the microprocessor configuration of FIG. 1.

FIG. 2 illustrates block diagram 200 of an alternate embodiment of a pipeline configuration, which is a variation from the block diagram 100 of FIG. 1. Similar to block diagram 100, the CPU fetches a present instruction from memory, cache, etc. Once the present instruction is fetched, the processor decodes the present instruction, as shown in decode stage 115. However, as shown in FIG. 2, the processor's next step is to fetch an operand, as shown in operand fetch stage 205. The processor reads the values called for by the operation from registers (fast internal storage locations) or from memory. After the present instruction is decoded (stage 115), and the operands are fetched (stage 205), the processor executes the present instruction (stage 120), and writes the result back into the register file (stage 125).

As is evident to one of ordinary skill in the art, block diagrams 100 and 200, illustrated in FIGS. 1 and 2 respectively, are merely representations of the various steps a microprocessor executes in operation. These figures are not intended to limit the present disclosure, as various processes within a computer may be added or subtracted from the representations discussed herein. Further, as shown in the variation from FIG. 1 to FIG. 2, similar steps may be represented in a plurality of ways. As a nonlimiting example, as is obvious to one of ordinary skill in the art, the processes discussed in FIGS. 1 and 2 may be represented with any of a plurality of different blocks or stages. This disclosure is not constrained to the 5 blocks represented in FIG. 1, or the 6 blocks in FIG. 2. Any number of steps and processes may be implemented.

Figure 3:
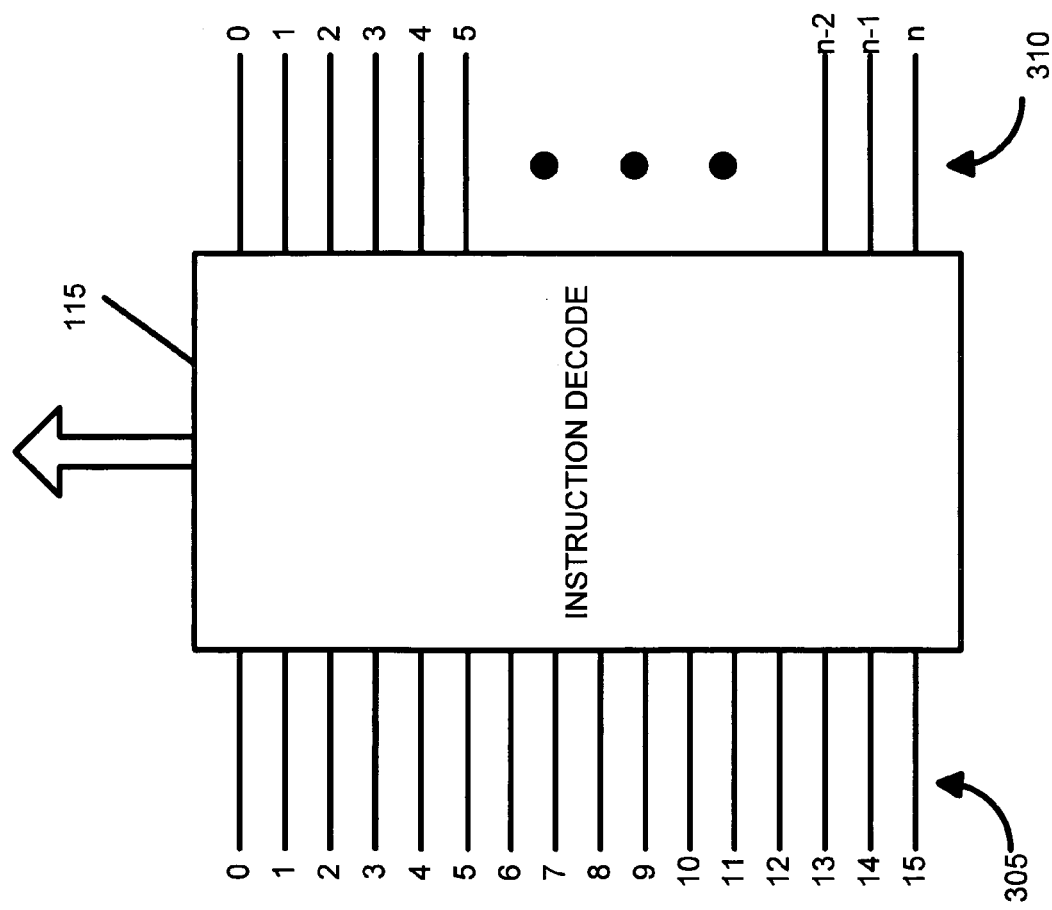
FIG. 3 is a functional block diagram of one embodiment of a decoder that may be positioned within the microprocessors of FIG. 1 or 2.

FIG. 3 is a functional block diagram of one embodiment of instruction decoder 115 that may be positioned within the microprocessor of FIG. 1. As shown in FIG. 3, 16 inputs 305 are coupled to the instruction decoder 115, which has n outputs 310. The outputs 310 communicate signals that indicate the registers to be accessed, along with other data used by the CPU. In this regard, the outputs 310 from the decoder 115 are signal lines that are used as inputs and/or control signals for other circuit components within an execution unit (not shown) of the processor. The execution unit carries out the functional operations specified by the encoded instructions. The purpose of this nonlimiting example is to illustrate that instruction decode 115 may comprise a plurality of inputs and outputs, and is not limited to the single input/output representation of other figures in this disclosure.

Figure 4:
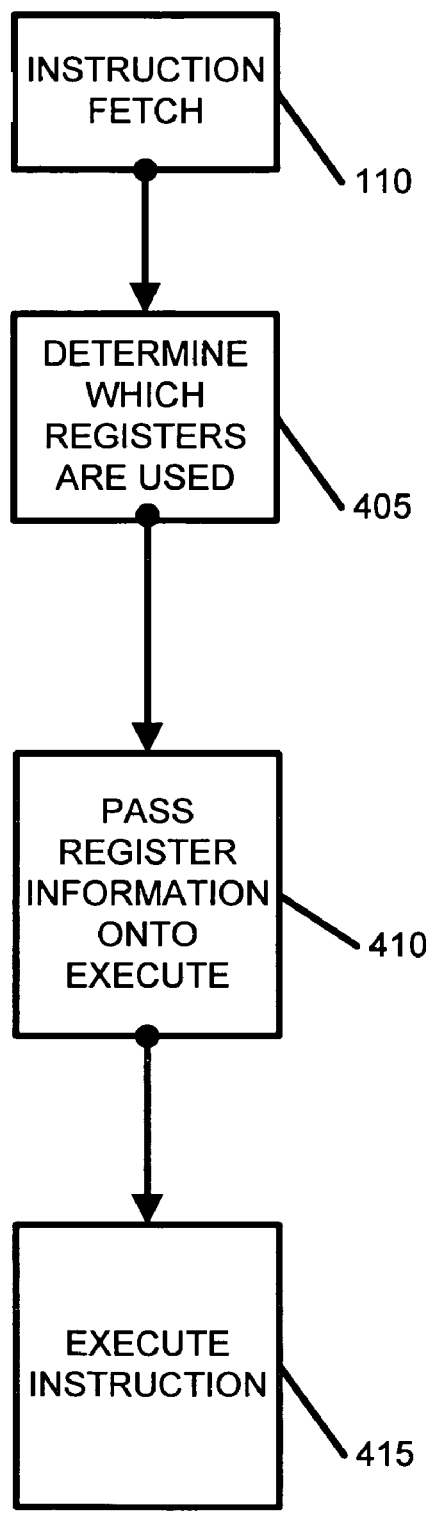
FIG. 4 is a flowchart diagram of one embodiment of the steps utilized in microprocessor of FIG. 1 or 2.

FIG. 4 is a flowchart diagram demonstrating logical steps that may be performed in a CPU, particularly between fetching and executing an instruction. As stated above, instruction fetch stage 110 will retrieve the present instruction. The decode stage 115 will (among other things) determine which registers are used for the operation, as shown in block 405, and pass the register information onto the execute stage 120, as shown in block 410. Execute stage 120 will then execute the instruction, as shown in block 415. As stated above, this implementation will consume excess power, which will reduce battery life of the device. However, this disclosure illustrates an implementation designed to reduce power consumption.

Figure 5:
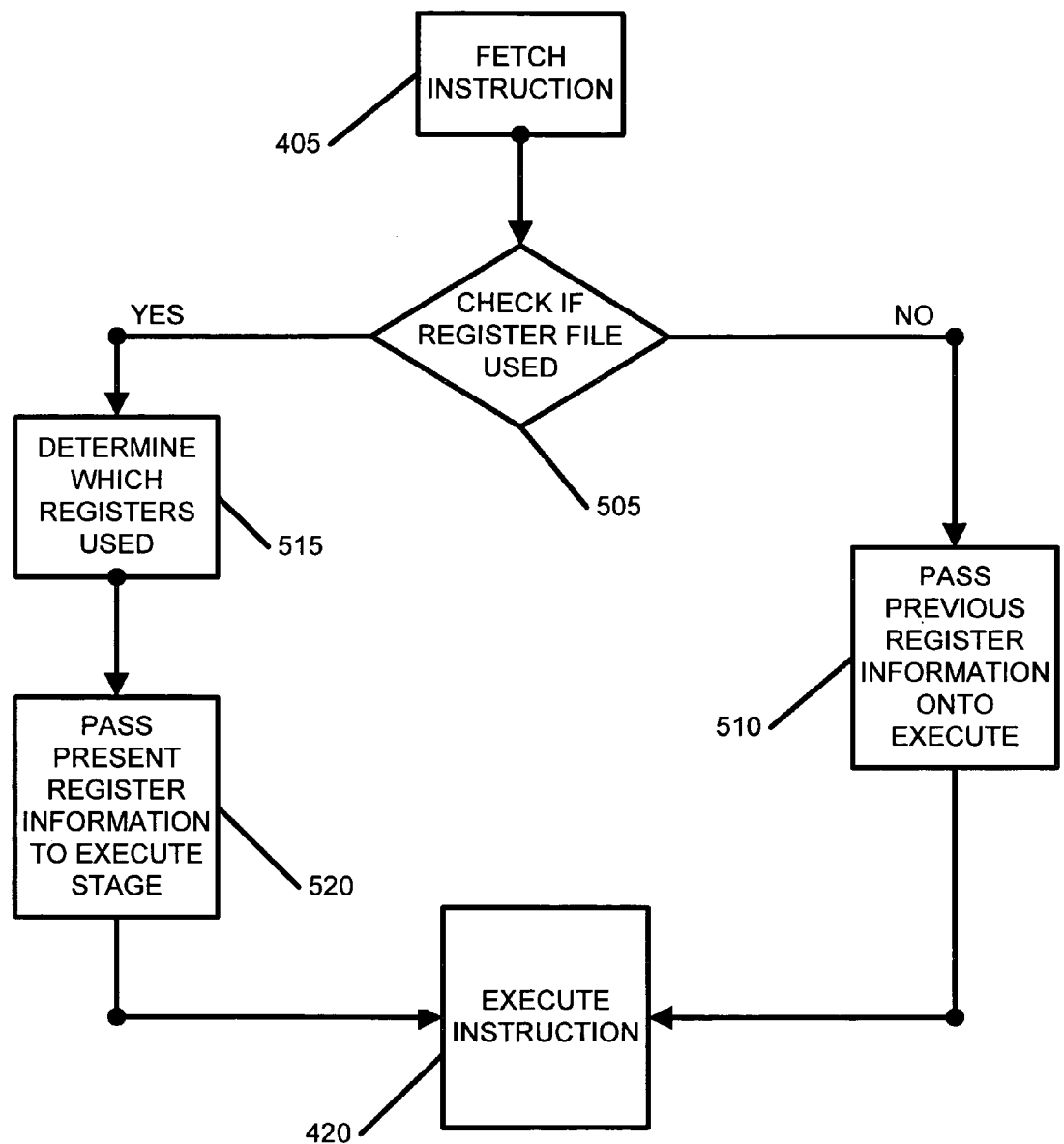
FIG. 5 is a flowchart diagram of one embodiment of steps utilized microprocessor configuration of FIG. 1 or 2.

FIG. 5 is a flowchart diagram demonstrating logical steps of one embodiment of the processor configuration of FIG. 2. Just as described above with regard to FIG. 4, the CPU will fetch the present instruction in block 405. Then, decode stage 115 will determine whether a register file is used for the present instruction, as shown in decision block 505. If a register file is used, the CPU will determine which registers are to be used (block 515) and will pass the present register information onto execute block 120, as shown in block 520. The CPU will then execute the instruction, as shown in block 420.

If the CPU determines that no registers are needed, it will pass previous register information onto execute block 420 as shown in by block 510, which will result in the CPU executing the instruction. In this process, the instruction decoder stage 115 maintains its present state, and there is no power loss attributed to the additional switching of logic gates.

Figure 6:
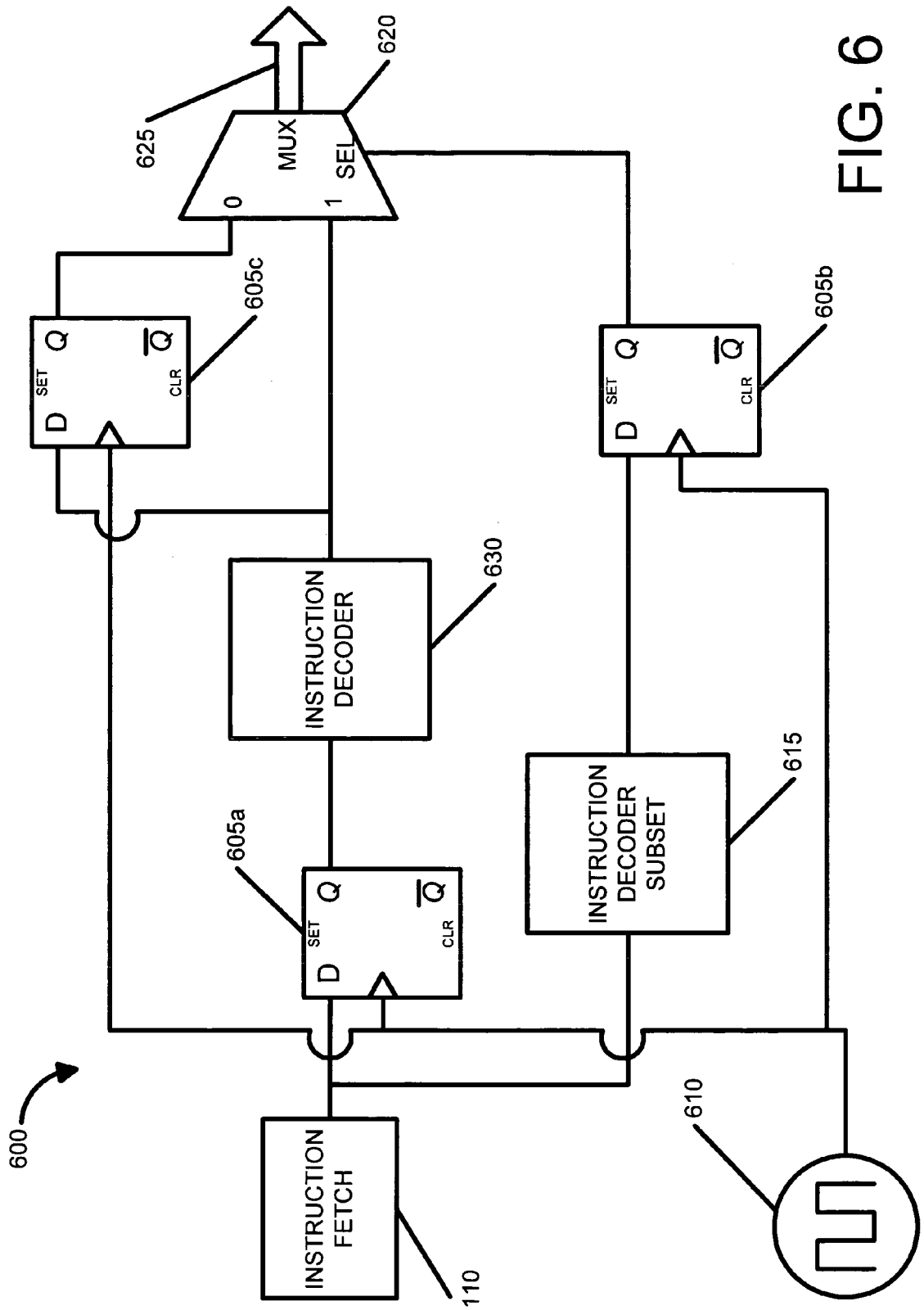
FIG. 6 is a diagram illustrating the power reducing logic of the present disclosure, located within the decode stage of either FIG. 1 or 2.

FIG. 6 is a diagram illustrating the power reducing logic 600 of the present disclosure located within the instruction decode stage 115 of either FIG. 1 or 2. This circuit 600 saves power by determining whether a register is potentially necessary in the execution of a present instruction, and if not, holding the state of the unused signals. As a nonlimiting example, instruction fetch stage 110 may be configured to communicate instruction data into both a flip-flop module 605a and instruction decoder subset module 615. Flip-flop module 605a communicates its output signal to instruction decoder module 630, which decodes the signal, as stated above. Instruction decoder module 630 generally determines the register(s) to access when executing the present instruction. However, when the present instruction does not utilize a register, the processor circuit may switch between states throughout the cycle, thereby consuming excessive power that may prematurely deplete a battery, as a nonlimiting example.

In FIG. 6, instruction decoder subset module 615 is merely a subset of instruction decoder 630. Instruction decoder subset 615 is needed to determine whether a register is potentially needed to execute a present instruction. If instruction decoder subset module 615 determines that a given instruction needs a register for execution, it will communicate a signal to flip-flop module 605b, which is thereafter communicated to the select input of multiplexor 620. The signal communicated to multiplexor 620 indicates that a present instruction needs a register and that the data from instruction decoder 630 is valid. As a nonlimiting example, in FIG. 6, if at least one register is needed for a present instruction, instruction decoder subset module 615 will communicate a logical "1" to the select input of multiplexor 620 via flip-flop module 605b. Multiplexor 620 will then allow the data from instruction decoder module 630 to pass to the execute stage 120 (from FIGS. 1 and 2) via register select 625.

If on the other hand, instruction decoder subset module 615 determines that no register is needed for a present instruction, the module 615 will communicate a signal to the select input of multiplexor 620 (via flip-flop module 605b) indicating that no register is needed. Multiplexor 620 will then allow a control signal communicated from flip-flop module 605c to pass to execute stage 120. On the next clock cycle, determined by clock 610, instruction decoder module 630 will then update flip-flop module 605c for the next instruction.

In this embodiment, flip-flop module 605c contains register data from a previous instruction and holds stable the circuitry that is not used when no register is needed. By communicating register data from a previous instruction, the elements within the processor circuit will switch states less often; meaning the CPU will consume less power, thereby prolonging battery life.

Stated another way, if instruction decoder subset module 615 determines that no register is needed for a present instruction, module 615 may communicate a logical "0" signal into the select input of multiplexor 620, via flip-flop module 605b. Multiplexor 620 will then allow the register data from the previous instruction pass to execute stage 120 (FIGS. 1 and 2).

As is obvious to one of ordinary skill in the art, if two consecutive instructions do not involve a register, the processor circuit will perform the same actions. A flip-flop (e.g., flip-flop modules 605a, 605b, 605c) will capture the data at a predetermined point on a clock cycle, regardless of whether an actual register is accessed. So, instead of switching between states, the circuit (e.g., circuit 600) will communicate the values captured at that point. As a nonlimiting example, if the flip-flop modules (605a, 605b, and 605c) of circuit 600 are "rising edge" flip-flops they will capture the signal(s) from instruction decoder module 630 on the rising edge of the clock cycle and will maintain those values until the next rising edge. This action will stabilize unused logic in circuit 600 because the signal is held constant. Since the signal is held constant, switching is reduced, and power is saved.

Figure 7:
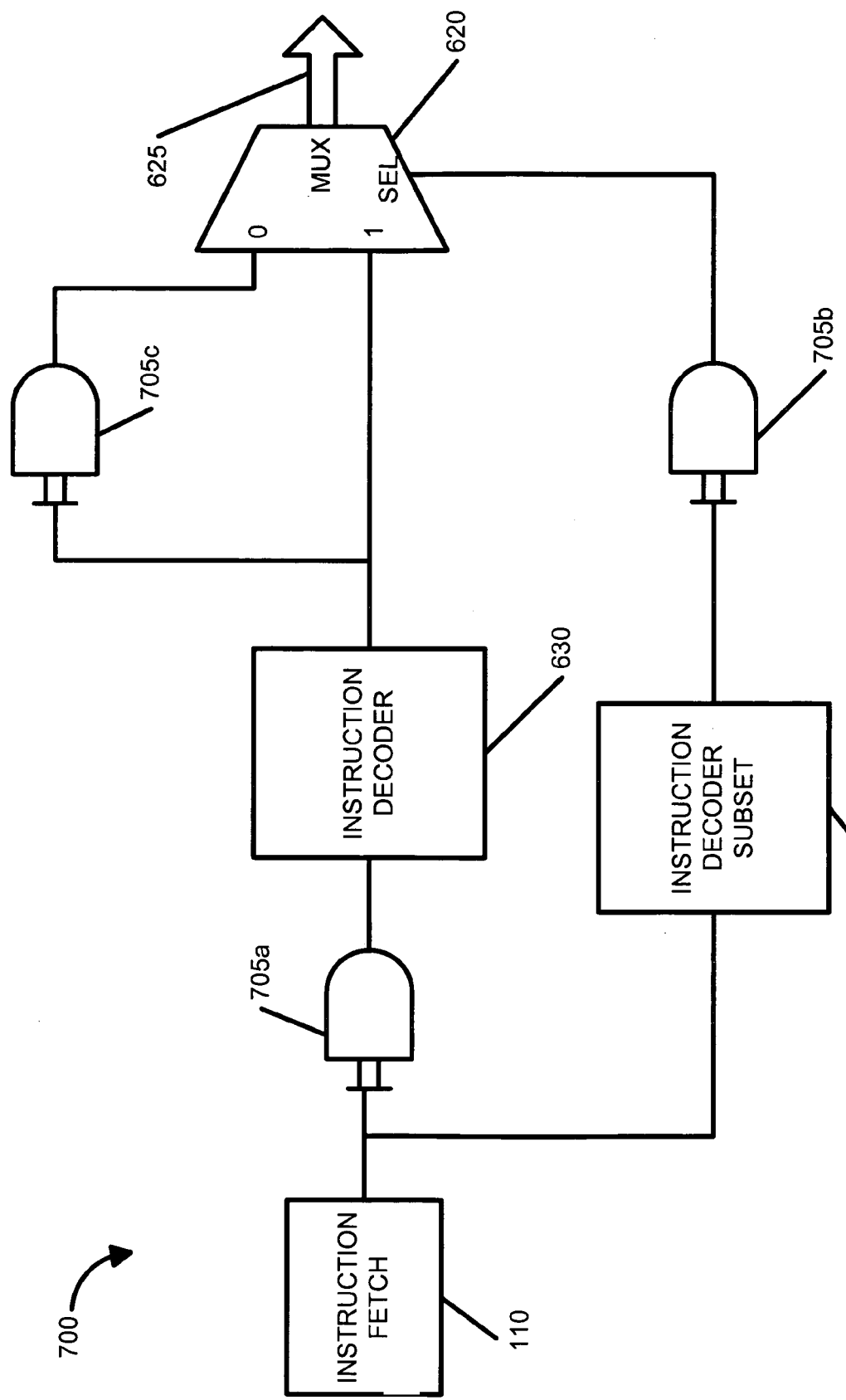
FIG. 7 is a diagram of a power reducing circuit of the present disclosure, located within the decode stage of either FIG. 1 or 2.

FIG. 7 is a diagram of an alternate embodiment of a circuit, similar to the circuit 600 of FIG. 6, with the exception that AND gates 705a, 705b, and 705c are substituted for the corresponding flip-flops of FIG. 6. In FIG. 7, instruction decoder subset module 615 is a subset of instruction decoder 630. Instruction decoder subset 615 determines whether a register is potentially needed to execute a present instruction. If instruction decoder subset module 615 determines that a given instruction needs a register for execution, it will communicate a signal to AND gate 705b, which is thereafter communicates a signal to the select input of multiplexor 620. The signal communicated to multiplexor 620 represents that a present instruction needs a register and that the data from instruction decoder 630 is valid.

As a nonlimiting example, in FIG. 7, if at least one register is needed for a present instruction, instruction decoder subset module 615 will communicate a logical "1" to the select input of multiplexor 620 via AND gate 705b. Multiplexor 620 will then allow the data from instruction decoder module 630 to pass to the execute stage 120 (from FIGS. 1 and 2) via register select 625.

If on the other hand, instruction decoder subset module 615 determines that no register is needed for a present instruction, the module 615 will communicate a signal to the select input of multiplexor 620 (via AND gate 705b) indicating that no register is needed. Multiplexor 620 will then allow a control signal communicated from AND gate 705c to pass to execute stage 120.

On the next clock cycle instruction decoder module 630 will then update AND gate 705c for the next instruction. In this embodiment, AND gate 705c holds a register data signal from a previous instruction, which stabilizes the circuitry that is not used when no register is needed. By communicating register data from a previous instruction, the entire processor circuit will switch states less often, meaning the CPU will consume less power, thereby prolonging battery life.

If instruction decoder subset module 615 determines that no register is needed for a present instruction, module 615 may communicate a logical "0" signal into the select input of multiplexor 620, via AND gate 705b. Multiplexor 620 will then allow the register data from the previous instruction pass to execute stage 120 (FIGS. 1 and 2).

As is evident to one of ordinary skill in the art, any of a plurality of elements can perform the intended function to achieve the desired result. Depictions of circuit elements such as these are intended to illustrate the novel points of the present disclosure, not to limit it to any one depiction.

As is also evident to one of ordinary skill in the art, circuits 600 and 700, depicted in FIGS. 6 and 7, respectively are merely a representation of circuits with the above mentioned capabilities. The elements in a typical CPU will have numerous signal lines, and multiple components may be required to implement the above-mentioned functions, depending on system parameters.

In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly and legally entitled.

The invention claimed is:

1. A circuit configured to reduce power consumption in a microprocessor, comprising:
    first instruction decoder logic configured to determine whether a present instruction needs a register file access for execution and to output a predetermined signal corresponding to whether a register file is needed;
    multiplexing logic coupled to the first instruction decoder logic and configured to receive an input corresponding to the output of the first instruction decoder logic, wherein the multiplexor logic is configured to allow register data from a previous instruction to execute if the predetermined signal has a predetermined logical value; and
    second instruction decoder logic configured to identify a register file to access in association with the present instruction, the second instruction decoder logic having an output configured to access the register file if the first decoder logic determines that the present instruction needs a register file access.

2. The circuit of claim 1, further comprising a flip-flop coupled to the second decoder logic, the flip-flop configured to store data from the present instruction and output data from the previous instruction if no register is needed by the present instruction.

3. The circuit of claim 1, further comprising a flip-flop coupled to the first decoder logic, the flip-flop configured to store a signal corresponding to whether the present instruction involves a register.

4. The circuit of claim 1, further comprising a flip-flop coupled to the second decoder logic, the flip-flop configured to store data from the present instruction and output data from the present instruction to the second decoder logic.

5. The circuit of claim 1, further comprising an AND gate coupled to the second decoder logic, the AND gate configured to store data from the present instruction and output data from the present instruction to the second decoder logic.

6. A method for reducing power consumption in a microprocessor comprising:
    fetching a present instruction;
    determining whether the present instruction involves a register;
    producing a signal that indicates whether a register is involved;
    producing a register select, the register select having a present state and indicating registers involved by the present instruction; and
    maintaining the present state of the register select when no register is required, wherein maintaining the present state of the register select stabilizes logic gates within the microprocessor such that less power is consumed.

7. The method of claim 6, further comprising decoding the present instruction.

8. The method of claim 6, further comprising partially decoding the present instruction.

9. A system for reducing power consumption in a microprocessor, comprising:
    subset instruction decoder logic configured to determine whether a present instruction potentially involves at least one register;
    full instruction decoder logic configured to determine the at least one register needed by the present instruction;
    a register signal configured to indicate the at least one register determined by the full instruction decoder;
    memory logic configured output at least one control signal; and
    selector logic configured to output the at least one control signal if no register is needed by the present instruction and the register signal if a register is needed by the present instruction.

10. The system of claim 9, wherein the control signal comprises a register signal from a previous instruction.

11. The system of claim 9, further comprising a plurality of memory elements.

12. The system of claim 9, wherein the selector logic is a multiplexor.

13. The system of claim 9, further comprising at least one AND gate.

14. A computer readable medium having a computer program for reducing power consumption in a microprocessor comprising:
    a first portion of code fetching an instruction;
    a second portion of code determining whether the present instruction involves a register;
    a third portion of code producing a signal indicating whether a register is involved;
    a forth portion of code providing a register select, the register select having a present state and indicating registers needed by the present instruction; and
    a fifth portion of code maintaining the present state of the register select when no register is involved, wherein maintaining the present state of the register select avoids switching of logic gates within the microprocessor such that less power is consumed.

15. The computer readable medium of claim 14, further comprising a seventh portion of code for decoding the present instruction.

16. The computer readable medium of claim 14, further comprising an eighth portion of code partially decoding the present instruction.

* * * * *